US008867131B1

(12) United States Patent
Amirparviz

(10) Patent No.: US 8,867,131 B1
(45) Date of Patent: Oct. 21, 2014

(54) HYBRID POLARIZING BEAM SPLITTER

(75) Inventor: Babak Amirparviz, Mountain View, CA (US)

(73) Assignee: Google Inc., Mountain View, CA (US)

( * ) Notice: Subject to any disclaimer, the term of this patent is extended or adjusted under 35 U.S.C. 154(b) by 286 days.

(21) Appl. No.: 13/413,228

(22) Filed: Mar. 6, 2012

(51) Int. Cl.
*G02B 5/30* (2006.01)
*G02B 5/04* (2006.01)

(52) U.S. Cl.
CPC ............... *G02B 5/04* (2013.01); *G02B 5/3041* (2013.01)
USPC ................. 359/485.03; 359/485.06; 359/638; 359/833

(58) Field of Classification Search
CPC ....... G02B 5/04; G02B 5/3041; G02B 5/3066
USPC .......... 359/485.02, 485.03, 485.06, 630, 634, 359/638, 831, 833
See application file for complete search history.

(56) References Cited

U.S. PATENT DOCUMENTS

| 4,711,512 | A | 12/1987 | Upatnieks |
| 5,076,664 | A | 12/1991 | Migozzi |
| 5,093,567 | A | 3/1992 | Staveley |
| 5,539,422 | A | 7/1996 | Heacock et al. |
| 5,696,521 | A | 12/1997 | Robinson et al. |
| 5,715,337 | A | 2/1998 | Spitzer et al. |
| 5,771,124 | A | 6/1998 | Kintz et al. |
| 5,815,126 | A | 9/1998 | Fan et al. |
| 5,844,530 | A | 12/1998 | Tosaki |
| 5,886,822 | A | 3/1999 | Spitzer |
| 5,896,232 | A | 4/1999 | Budd et al. |
| 5,926,318 | A | 7/1999 | Hebert |
| 5,943,171 | A | 8/1999 | Budd et al. |
| 5,949,583 | A | 9/1999 | Rallison et al. |
| 6,023,372 | A | 2/2000 | Spitzer et al. |
| 6,046,867 | A * | 4/2000 | Rana ............................. 359/831 |
| 6,091,546 | A | 7/2000 | Spitzer |
| 6,172,657 | B1 | 1/2001 | Kamakura et al. |
| 6,201,629 | B1 | 3/2001 | McClelland et al. |
| 6,204,974 | B1 | 3/2001 | Spitzer |
| 6,222,677 | B1 | 4/2001 | Budd et al. |
| 6,349,001 | B1 | 2/2002 | Spitzer |
| 6,353,492 | B2 | 3/2002 | McClelland et al. |

(Continued)

FOREIGN PATENT DOCUMENTS

| GB | 975281 | * 11/1964 | ............ G01N 21/43 |
| GB | 2272980 A | 6/1994 | |
| WO | WO96/05533 A1 | 2/1996 | |

OTHER PUBLICATIONS

Levola, Tapani, "Diffractive Optics for Virtual Reality Displays", Academic Dissertation, Joensuu 2005, University of Joensuu, Department of Physics, Vaisala Laboratory, 26 pages.

(Continued)

*Primary Examiner* — Frank Font
(74) *Attorney, Agent, or Firm* — Blakely Sokoloff Taylor & Zafman LLP

(57) ABSTRACT

A polarizing beam splitter ("PBS") includes a glass wedge having a first oblique surface, a multi-layer polarizing coating disposed on the first oblique surface of the glass wedge, and a plastic wedge having a second oblique surface. The first oblique surface of the glass wedge is mated to the second oblique surface of the plastic wedge with the multi-layer polarizing coating sandwiched between the first and second oblique surfaces.

21 Claims, 7 Drawing Sheets

(56) References Cited

U.S. PATENT DOCUMENTS

| | | |
|---|---|---|
| 6,353,503 B1 | 3/2002 | Spitzer et al. |
| 6,356,392 B1 | 3/2002 | Spitzer |
| 6,384,982 B1 | 5/2002 | Spitzer |
| 6,538,799 B2 | 3/2003 | McClelland et al. |
| 6,563,648 B2 * | 5/2003 | Gleckman et al. ............ 359/630 |
| 6,618,099 B1 | 9/2003 | Spitzer |
| 6,690,516 B2 | 2/2004 | Aritake et al. |
| 6,701,038 B2 | 3/2004 | Rensing et al. |
| 6,724,354 B1 | 4/2004 | Spitzer |
| 6,738,535 B2 | 5/2004 | Kanevsky et al. |
| 6,747,611 B1 | 6/2004 | Budd et al. |
| 6,829,095 B2 | 12/2004 | Amitai |
| 6,879,443 B2 | 4/2005 | Spitzer et al. |
| 6,880,931 B2 | 4/2005 | Moliton et al. |
| 7,158,096 B1 | 1/2007 | Spitzer |
| 7,242,527 B2 | 7/2007 | Spitzer et al. |
| 7,307,791 B2 * | 12/2007 | Li et al. ......................... 359/630 |
| 7,391,573 B2 | 6/2008 | Amitai |
| 7,457,040 B2 | 11/2008 | Amitai |
| 7,576,916 B2 | 8/2009 | Amitai |
| 7,577,326 B2 | 8/2009 | Amitai |
| 7,643,214 B2 | 1/2010 | Amitai |
| 7,663,805 B2 | 2/2010 | Zaloum et al. |
| 7,672,055 B2 | 3/2010 | Amitai |
| 7,724,441 B2 | 5/2010 | Amitai |
| 7,724,442 B2 | 5/2010 | Amitai |
| 7,724,443 B2 | 5/2010 | Amitai |
| 7,843,403 B2 | 11/2010 | Spitzer |
| 7,900,068 B2 | 3/2011 | Weststrate et al. |
| 8,004,765 B2 | 8/2011 | Amitai |
| 2003/0090439 A1 | 5/2003 | Spitzer et al. |
| 2005/0174651 A1 | 8/2005 | Spitzer et al. |
| 2006/0192306 A1 | 8/2006 | Giller et al. |
| 2006/0192307 A1 | 8/2006 | Giller et al. |
| 2008/0219025 A1 | 9/2008 | Spitzer et al. |
| 2009/0122414 A1 | 5/2009 | Amitai |
| 2010/0046070 A1 | 2/2010 | Mukawa |
| 2010/0103078 A1 | 4/2010 | Mukawa et al. |
| 2010/0149073 A1 | 6/2010 | Chaum et al. |
| 2010/0278480 A1 | 11/2010 | Vasylyev |
| 2011/0213664 A1 | 9/2011 | Osterhout et al. |
| 2012/0212414 A1 * | 8/2012 | Osterhout et al. ............ 345/158 |

OTHER PUBLICATIONS

Mukawa, Hiroshi et al., "Distinguished Paper: A Full Color Eyewear Display using Holographic Planar Waveguides", SID Symposium Digest of Technical Papers—May 2008—vol. 39, Issue 1, pp. 89-92.

* cited by examiner

HYBRID POLARIZING BEAM SPLITTER

TECHNICAL FIELD

This disclosure relates generally to the field of optics, and in particular but not exclusively, relates to polarizing beam splitters.

BACKGROUND INFORMATION

FIG. 1 illustrates a conventional polarizing beam splitter ("PBS") 100. PBS 100 is made of a polarizing film 105 disposed between two glass prisms 110 and 115. Polarizing film 105 is engineered to achieve the desired polarizing effect whereby the majority of S polarized light is reflected while the majority of P polarized light is transmitted.

The two halves of PBS 100, or prisms 110 and 115, are fabricated of glass due to the constraints of fabricating polarizing film 105. Fabricating the multi-layer film requires repetitious, high temperature manufacturing processes. Glass is a transparent material that is capable of withstanding these repetitious, high temperature processes without degrading its desirable optical properties.

Glass is not anisotropic, which is to say it does not induce birefringence. Birefringence within a material volume imparts a different index of refraction to different axes of polarization. In optical systems, birefringence can be detrimental to the image quality, since it can decompose a single ray of light into multiple divergent rays light. For example, many optical grade plastics are birefringent and the degree of birefringence can increase with heat exposure. Heat exposure within plastics can induce localized stresses within the material bulk. These localized stresses in turn can result in deleterious birefringence. In optical systems that are polarization sensitive, the birefringence can particularly degrade the quality of the optical system.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of an apparatus, technique of fabrication, and system of use for a hybrid (e.g., half-glass) polarizing beam splitter ("PBS") are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
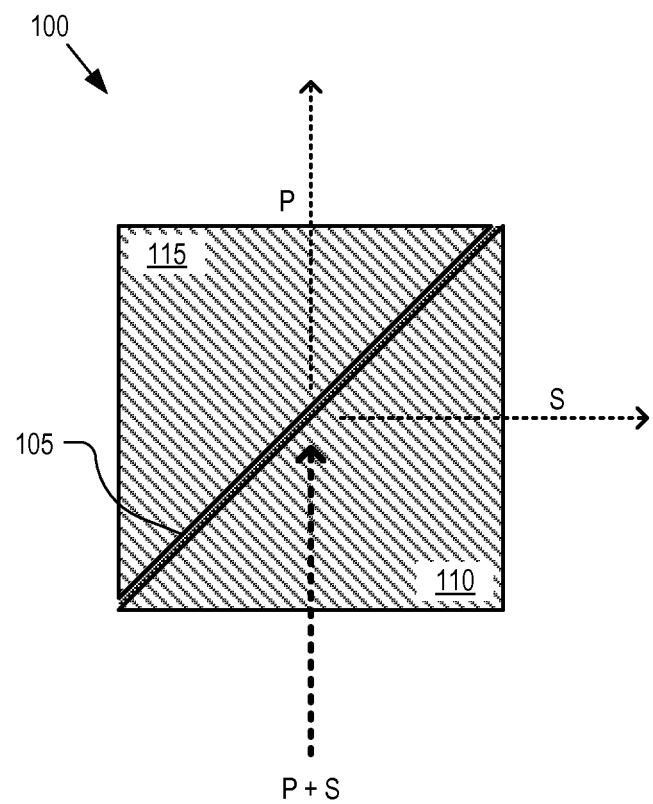
FIG. 1 illustrates a conventional glass polarizing beam splitter cube.
Figure 2:
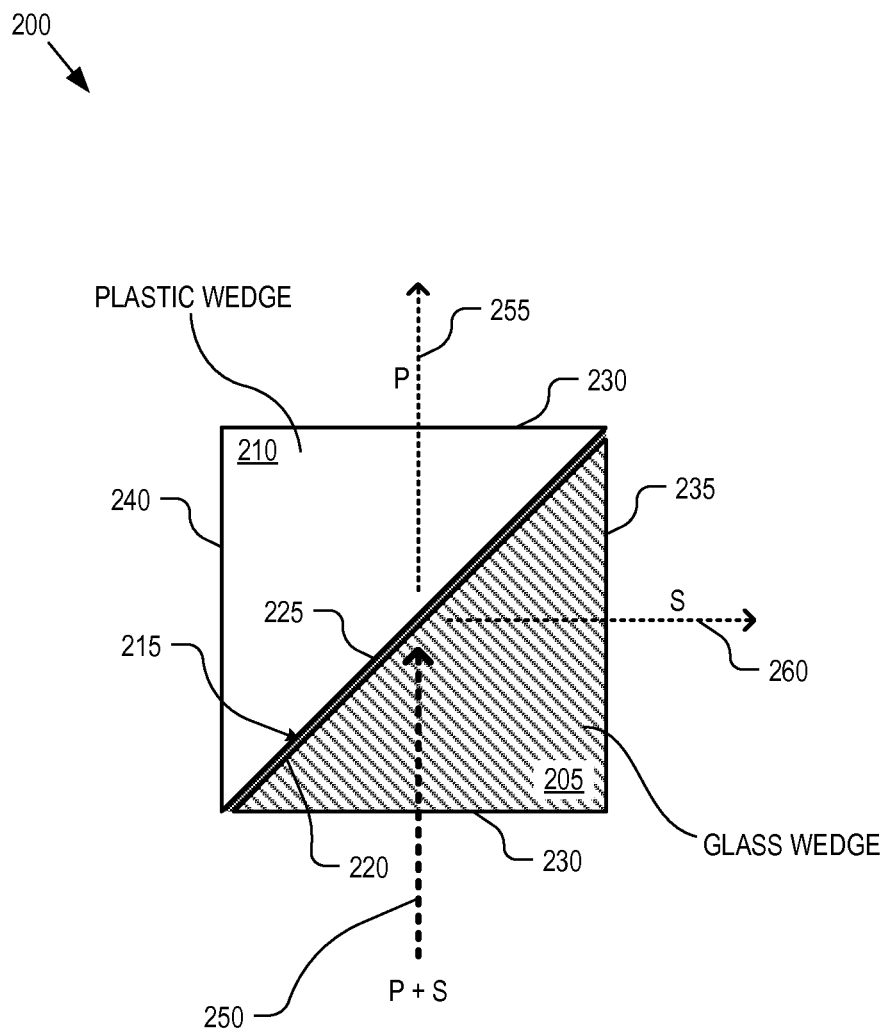
FIG. 2 illustrates a hybrid polarizing beam splitter including plastic and glass wedges, in accordance with an embodiment of the disclosure.

FIG. 2 illustrates a hybrid PBS 200 including combined plastic and glass wedges, in accordance with an embodiment of the disclosure. The illustrated embodiment of hybrid PBS 200 includes a glass wedge 205, a plastic wedge 210, and a multi-layer polarizing coating 215.

Hybrid PBS 200 is implemented as a volumetric shape having two portions that are each formed by either glass wedge 205 or plastic wedge 210. The volumetric shape may be implemented as a cube (illustrated), a rectangular box, or otherwise. Glass wedge 205 includes an oblique surface 220 that is mated to an oblique surface 225 of plastic wedge 210 with multi-layer polarizing coating 215 sandwiched there between. In the illustrated embodiment, hybrid PBS 200 includes three pairs of parallel external sides 230 and 235 (the third pair is not illustrated but is parallel with the plane of the page) with each pair being substantially perpendicular to the other two pairs and oblique surfaces 220 and 225 being obliquely oriented to external sides 230 and 235 (e.g., 45 degrees in an example cube volume).

Plastic wedge 210 may be fabricated of a variety of optical grade plastics (e.g., acrylic, poly-methyl-metha-crylate (PMMA), ZEONEX-E48R, etc.), while glass wedge 205 is fabricated of glass, such as silica, along with one or more various additives, such as Na2O, CaO, etc. In one embodiment, the plastic material of plastic wedge 210 is selected to have a matching refractive index with glass wedge 205 (e.g., refractive index of approximately 1.5). In one embodiment, the plastic material of plastic wedge 210 may be selected to have a differing refractive index from glass wedge 205. By fabricating a portion of hybrid PBS 200 using plastic, the overall weight of hybrid PBS 200 can be substantially reduced versus an all glass PBS, such as PBS 100. Such weight reductions can be a significant benefit when hybrid PBS 200 is incorporated into weight sensitive applications, such as head mounted displays ("HMDs").

In one embodiment, multi-layer polarizing coating 215 is a multi-layer optical coating that is designed to reflect the majority of S polarized light while transmitting the majority of P polarized light. The polarization dependent reflectivity of multi-layer polarizing coating 215 is a function of the wavelength of incident light 250 and is typically highly angle dependent based upon Brewster's Angle. The desired polarizing effect is the result of interference between refracted and reflected rays at each interface of multi-layer polarizing coating 215. Multi-layer polarizing coating 215 includes a stack of two or more dielectric layers (typically tens of dielectric layers). In some embodiments, the stack may have an overall thickness of between 1 and 4 µm. The stack may include just two material layers of differing refractive indexes that alternate with various engineered thicknesses, or several material layers of differing refractive indexes that cycle in an engineered pattern with designed thicknesses.

The fabrication of multi-layer polarizing coating 215 is a cyclical thermal process whereby each layer is successively built onto of the previous layer. For example, each layer of multi-layer polarizing coating 215 may be deposited as a sputtered dielectric. This exposes the substrate material upon which multi-layer polarizing coating 215 is formed to cyclical thermal expansions and contractions. These expansions and contractions often induce residual stresses within plastic, which degrades the optical properties of the plastic. One such degradation caused by residual stresses within the plastic bulk is birefringence. Birefringent effects are multiplied near fine features (e.g., edges, corners) formed within plastic. Due to the susceptibility of plastic to internal stresses induced by cyclical thermal expansion and contraction, multi-layer polarizing coating 215 is formed onto oblique surface 220 of glass wedge 205. Glass does not exhibit birefringence and is significantly more resistant to thermal cycling degradation.

During operation, incident light 250 enters hybrid PBS 200 and strikes multi-layer polarizing coating 215. If the incident light is unpolarized (illustrated), then the P polarization components 255 pass through multi-layer polarizing coating 215, while the S polarization components 260 are reflected by multi-layer polarizing coating 215. If incident light 250 is already P polarized, then it will substantially pass through multi-layer polarizing coating 215 unaffected and exits hybrid PBS 200 on the opposing side from its entry. If incident light 250 is already S polarized, then it substantially reflects off of multi-layer polarizing coating 215 and exits hybrid PBS 200 at a redirected angle.

Figure 5:
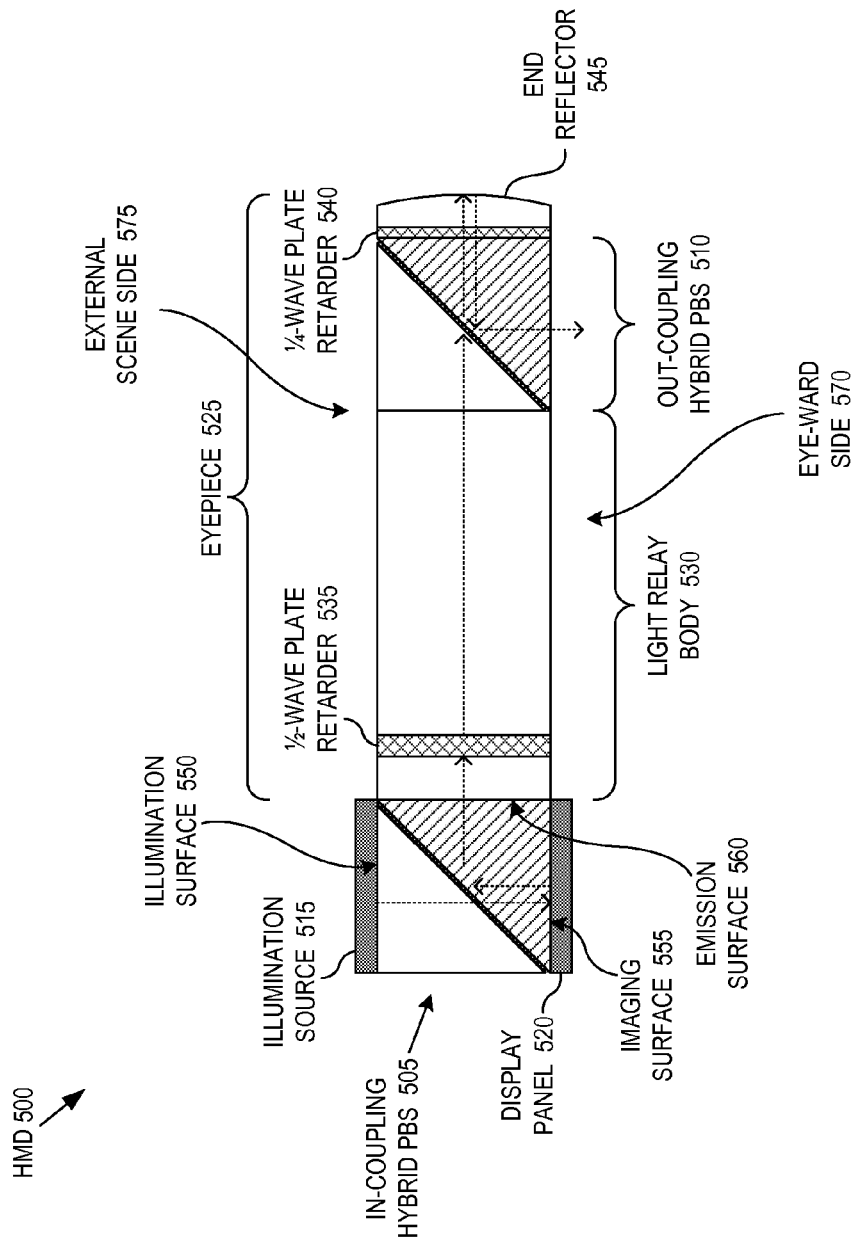
FIG. 5 is a cross-sectional diagram illustrating a head mounted display including in-coupling and out-coupling hybrid polarizing beam splitters, in accordance with an embodiment of the disclosure.
Figure 6:
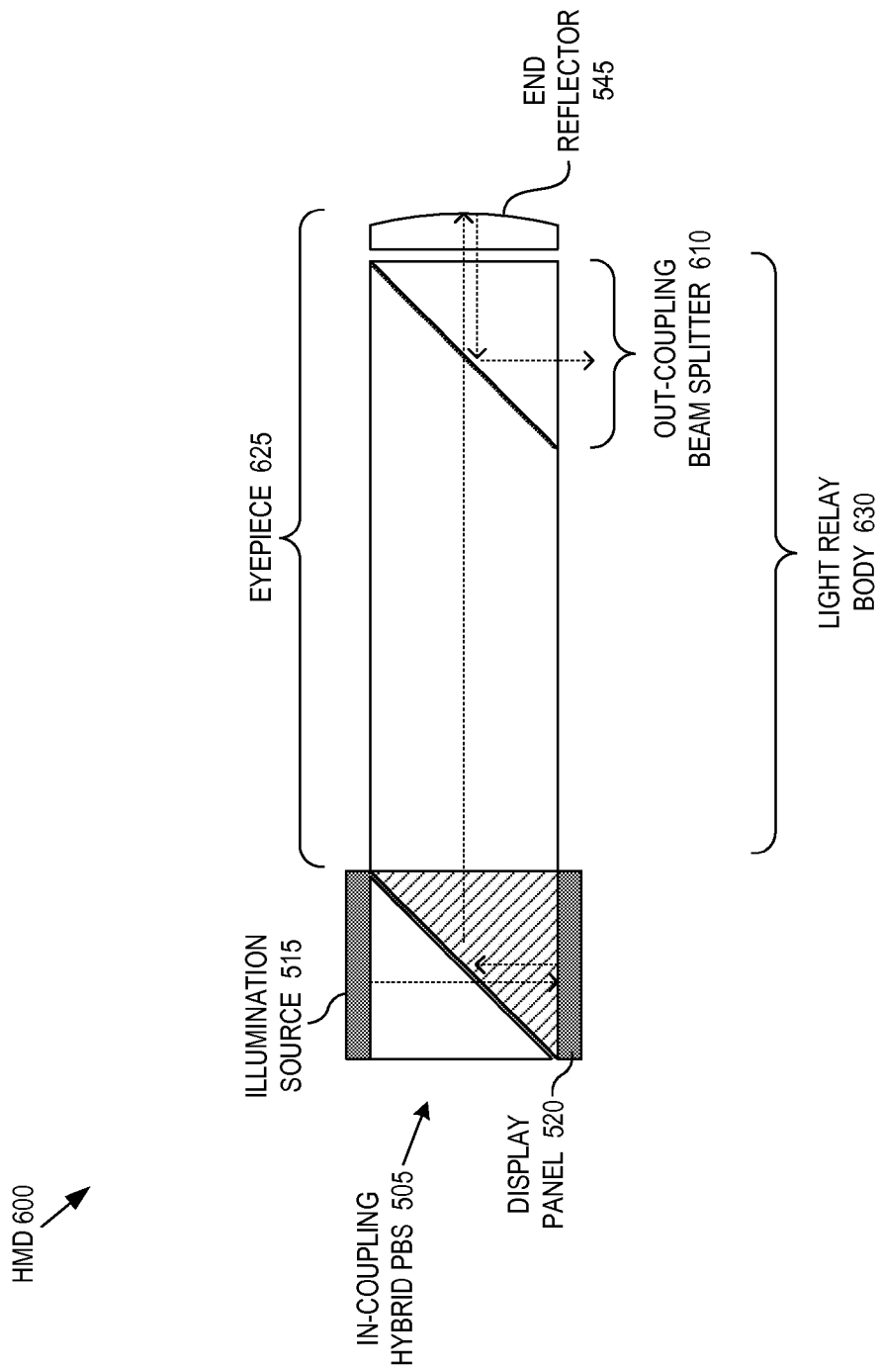
FIG. 6 is a cross-sectional diagram illustrating a head mounted display including an in-coupling hybrid polarizing beam splitter and an out-coupling non-polarizing beam splitter, in accordance with an embodiment of the disclosure.

As mentioned above, plastic is substantially more prone to exhibit birefringence than glass. Birefringence can have significant deleterious effects on optical systems, particularly polarization sensitive optical systems. As such, when incorporating hybrid PBS 200 into a optical system or optical apparatus, in one embodiment, hybrid PBS 200 is oriented such that the useful optical signal path remains within the glass wedge 205 while the used polarization components are expelled through plastic wedge 210. In one embodiment where the useful optical path passes through multi-layer polarizing coating 215 on a first pass and is reflected by multi-layer polarizing coating 215 on a second pass, then hybrid PBS 200 may be oriented such that the optical path has minimized exposure to plastic wedge 210. This can be achieved by orienting hybrid PBS 200 so that the incident light enters plastic wedge 210 and exits glass wedge 205 upon the first pass through hybrid PBS 200 and reenters glass wedge 205 upon the second pass whereby it is reflected by multi-layer polarizing coating 215 before entering plastic wedge 210 for a second time. FIGS. 5 and 6 illustrate example configurations for reducing the exposure of the optical path to plastic wedge 210.

Figure 3:
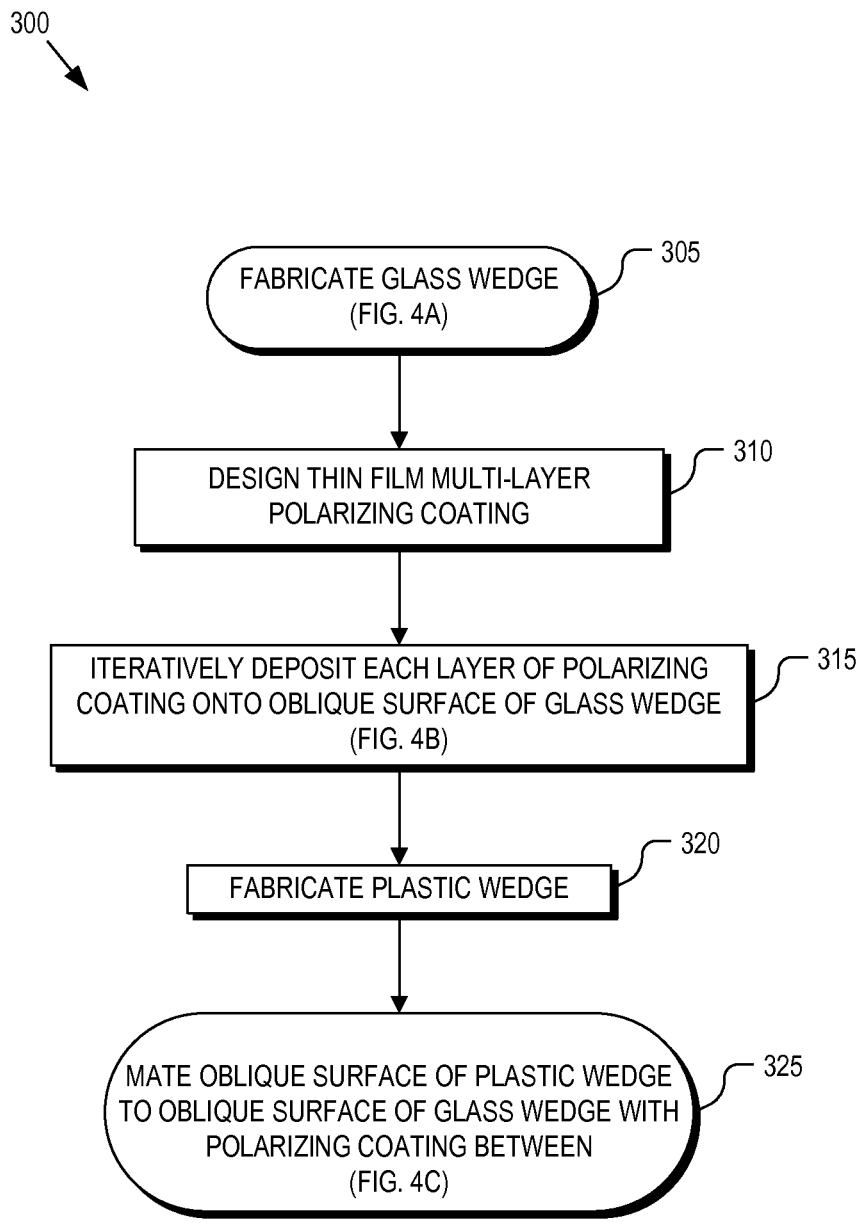
FIG. 3 is a process for fabricating a hybrid polarizing beam splitter, in accordance with an embodiment of the disclosure.
Figure 4C:
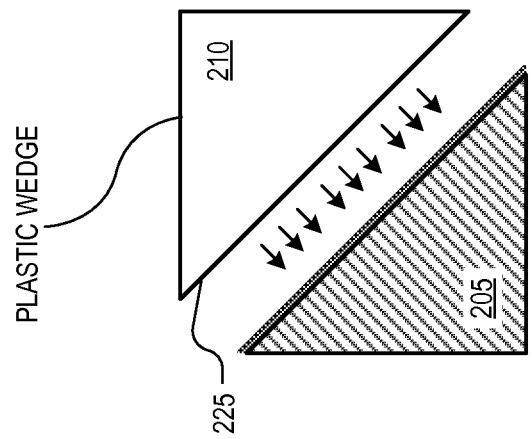
FIGS. 4A-C illustrate fabrication steps for making a hybrid polarizing beam splitter, in accordance with an embodiment of the disclosure.
Figure 4B:
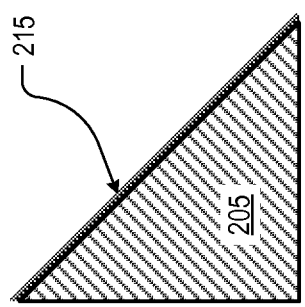

FIG. 3 is a process 300 for fabricating a hybrid PBS 200, in accordance with an embodiment of the disclosure. Process 300 is described in connection with FIGS. 4A-C. The order in which some or all of the process blocks appear in process 300 should not be deemed limiting. Rather, one of ordinary skill in the art having the benefit of the present disclosure will understand that some of the process blocks may be executed in a variety of orders not illustrated, or even in parallel.

Figure 4A:
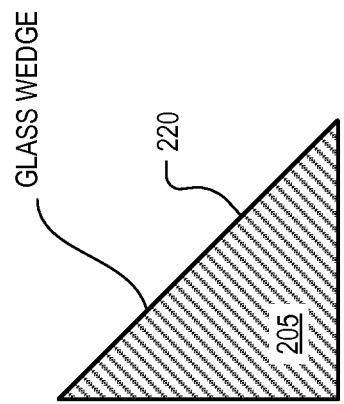

In a process block 305, glass wedge 205 is fabricated using conventional optical grade glass fabrication techniques (see FIG. 4A). In a process block 310, multi-layer polarizing coating 215 is designed to achieve the desired reflective polarizing effect at the desired wavelength and incident angle. Conventional techniques and available thin film dielectric software packages may be used to structurally design the individual layers of multi-layer polarizing coating 215. In a process block 315, multi-layer polarizing coating 215 is iteratively built up on oblique surface 220 of glass wedge 205 (see FIG. 4B). As discussed above, multi-layer polarizing coating 215 is fabricated onto glass wedge 205 instead of plastic wedge 210 due to the improved tolerance of glass to thermal cycling when compared to plastic. In a process block 320, plastic wedge 210 is fabricated using conventional plastic fabrication techniques (e.g., injection molding). Finally, in a process block 325, oblique surface 215 of plastic wedge 210 is mated to oblique surface 220 of glass wedge 205 such that multi-layer polarizing coating 215 is sandwiched in between. Plastic wedge 210 may be bonded to glass wedge 205 and multi-layer polarizing coating 215 via the application of a clear adhesive to one or both of oblique surface 215 or multi-layer polarizing coating 215 prior to mechanical alignment and mating of the two wedges. In one embodiment, a clear adhesive having the same or similar refractive index as plastic wedge 210 and/or glass wedge 205 is selected.

FIG. 5 is a cross-sectional diagram illustrating an HMD 500 including an in-coupling hybrid PBS 505 and out-coupling hybrid PBS 510, in accordance with an embodiment of the disclosure. In-coupling PBS 505 and out-coupling PBS 510 may be implemented with embodiments of hybrid PBS 200 illustrated in FIG. 2. The illustrated embodiment of HMD 500 includes in-coupling PBS 505, an illumination source 515, a display panel 520, and an eyepiece 525. The illustrated embodiment of eyepiece 525 includes a light relay body 530, out-coupling PBS 510, a half-wave plate retarder 535, a quarter-wave plate retarder 540, and end reflector 545.

Illumination source 515 generates lamp light used to illuminate display panel 520, which modules image data onto the lamp light to create image light or computer generated image light. The lamp light generated by illumination source 515 is launched into an illumination surface 550 of in-coupled hybrid PBS 505. In the illustrated embodiment, illumination surface 550 is disposed along plastic wedge 210 of in-coupling hybrid PBS 505. In-coupling hybrid PBS 505 substantially passes light of a first polarization (e.g., P polarization), while substantially reflecting light of a second polarization (e.g., S polarization). These two polarization components are typically orthogonal linear polarizations. The emitted light may be pre-polarized (e.g., P polarized) or unpolarized light. In either event, the P polarization components pass through the in-coupling hybrid PBS 505 to illuminate display panel 520 while most of any remaining portions of S polarization are reflected back (e.g., towards the left in FIG. 5).

Display panel 520 (e.g., liquid crystal on silicon panel, digital micro-mirror display, etc.) imparts image data onto the lamp light via selective reflection by an array of reflective pixels. In an embodiment using an LCOS panel, reflection by display panel 520 rotates the polarization of the incident lamp light by 90 degrees. Upon reflection of the incident lamp light, the image light (which has been rotated in polarization by 90 degrees to be, for example, S polarized) is directed back into in-coupling PBS 505 through an imaging surface 555. In the illustrated embodiment, imaging surface 555 is disposed along a first side of glass wedge 205. The image light passes through glass wedge 205 but is reflected by multi-layer polarizing coating 215 within in-coupling hybrid PBS 505 prior to entering into plastic wedge 210. The reflected image light then exits glass wedge 205 through emission surface 560 and enters into light relay body 530.

The image light propagates down light relay body 530 along a forward propagation path towards out-coupling hybrid PBS 510. The length of light relay body 530 may be selected based upon the temple-eye separation of the average adult and such that the focal plane of end reflector 545 substantially coincides with imaging surface 555, which corresponds with the emission aperture of display panel 520. To achieve focal plane alignment with the emission aperture of display panel 560, both the length of light relay body 530 and the radius of curvature of end reflector 545 may be selected in connection with each other.

In the illustrated embodiment, light relay body 530 includes half-wave plate retarder 535 within the forward propagation path of the image light. Half-wave plate retarder 535 servers to rotate the polarization of image light by 90 degrees (e.g., convert the S polarized light back to P polarized light again).

In the illustrated embodiment, out-coupling hybrid PBS 510 passes the image light propagating along the forward propagation path to quarter-wave plate retarder 540. After passing through quarter-wave plate retarder 540, the image light is reflected back along a reverse propagation path back towards the out-coupling hybrid PBS 510. Thus, the image light is rotated a total of 90 degree in polarization during its double pass through quarter-wave plate retarder 540 and is S polarized by the time it strikes multi-layer polarizing coating 215 within out-coupling hybrid PBS 510 on the reverse propagation path.

In one embodiment, end reflector 545 both reflects and collimates the image light such that the image light traveling along the reverse propagation path is substantially collimated. Collimating (or nearly collimating) the image light helps brings the image into focus for near-to-eye configurations (e.g., eyepiece 525 placed within 10 cm of an eye and typically less than 5 cm of an eye). The image light is directed out eye-ward side 570 towards the user's eye due to the oblique orientation of multi-layer polarizing coating 215.

By using two hybrid PBS's within the design of HMD 500, substantial weight can be removed from the overall unit. In one embodiment, only the glass wedges 210 within each hybrid PBS (both in-coupling and out-coupling hybrid PBS) are made of glass while the light relay body 530 and plastic wedges 205 within both in-coupling and out-coupling hybrid PBS are fabricated of plastic. The removal of about 50% of the glass in the optics can provide a substantial weight savings. Furthermore, the orientations of the hybrid PBS's within HMD 500 have been selected to reduce the overall length of the optical path within the plastic wedges. As can be seen, the optical path travels approximately twice the distance within the glass wedges than compared to the plastic wedges. This configuration serves to reduce the effects of birefringence.

Out-coupling hybrid PBS 510 is partially transparent to external light received through external scene side 575, since it passes one linear polarization component. In one embodiment, HMD 500 facilitates an augmented reality ("AR") where the image light is superimposed over external scene light. In another embodiment, eyepiece 525 is substantially opaque (or even selectively opaque), which facilitates a virtual reality ("VR") that immerses the user in the virtual environment displayed by the image light or provides greater image contrast.

FIG. 6 is a cross-sectional diagram illustrating an HMD 600 including an in-coupling hybrid PBS and out-coupling beam splitter, in accordance with an embodiment of the disclosure. HMD 600 is similar to HMD 500, but uses a non-polarizing beam splitter 610 for the out-coupling optics instead of a second hybrid PBS. While this configuration may not be as efficient as the design of HMD 500, the optics are simplified by the elimination of half-wave plate retarder 535 and quarter-wave plate retarder 540 and the overall design is lighter due to the elimination of a glass wedge in the out-coupling optics. The illustrated embodiment of HMD 600 includes in-coupling PBS 505, illumination source 515, display panel 520, and an eyepiece 625. The illustrated embodiment of eyepiece 625 includes a light relay body 630, out-coupling beam splitter 610, and end reflector 545.

In one embodiment, out-coupling beam splitter 610 comprises a partially reflective surface coating sandwiched between oblique surfaces of two plastic wedges. In one embodiment, the end of light relay body 630 may have a molded in prism to form one of the two plastic wedges between which the reflective surface coating is sandwiched. Since out-coupling beam splitter 610 is a conventional non-polarizing beam splitter (e.g., 50/50 beam splitter or other split ratio), the partially reflective coating may be fabricated using a thin layer of silver (e.g., a few nanometers) or other reflective material. The formation of a non-polarizing beam splitter can be accomplished with a single thermal fabrication process and does not require multiple iterative fabrication steps as does a PBS. As such, light weight optical grade plastic can be used as the substrate material without incurring significant thermal degradation during fabrication.

Figure 7:
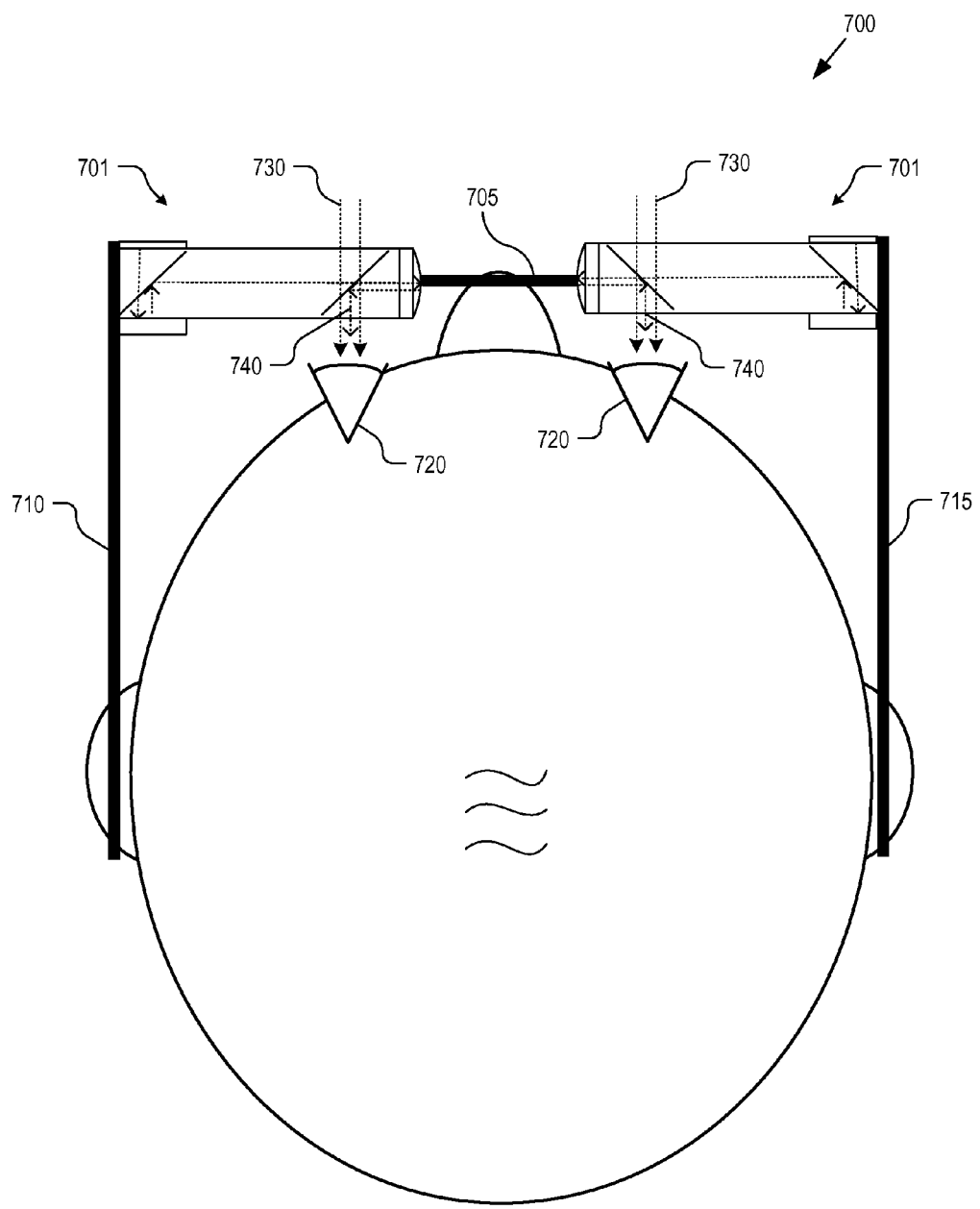
FIG. 7 is a top view of a binocular HMD system, in accordance with an embodiment of the disclosure.

FIG. 7 is a top view of a binocular HMD system 700 using a pair of HMDs 701, in accordance with an embodiment of the disclosure. Each HMD 701 may be implemented with embodiments of HMDs 500 or 600, or with other configurations of hybrid PBS 200. The HMDs 701 are mounted to a frame assembly, which includes a nose bridge 705, left ear arm 710, and right ear arm 715. Although FIG. 7 illustrates a binocular embodiment single, HMD 701 may also be mounted to a frame for use as a monocular HMD with only a single eyepiece. Since each HMD 701 has a reduced amount of glass due to the use of plastic wedges 210, the comfort and durability of binocular HMD system 700 is improved.

The two HMDs 701 are secured into an eyeglass arrangement that can be worn on the head of a user. The left and right ear arms 710 and 715 rest over the user's ears while nose assembly 705 rests over the user's nose. The frame assembly is shaped and sized to position a viewing region of the eyepiece in front of a corresponding eye 720 of the user. Of course, other frame assemblies having other shapes may be used (e.g., a visor with ear arms and a nose bridge support, a single contiguous headset member, a headband, goggles type eyewear, etc.).

The illustrated embodiment of binocular HMD system 700 is capable of displaying an augmented reality to the user. The viewing region of each HMD 701 permits the user to see a real world image via external scene light 730. Left and right (binocular embodiment) CGI light 740 may be generated by one or two CGI engines (not illustrated) coupled to a respective image source of HMDs 701. CGI light 740 is seen by the user as virtual images superimposed over the real world as an augmented reality. In some embodiments, external scene light 730 may be blocked or selectively blocked to provide a head mounted virtual reality display or heads up display.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An apparatus, comprising:
    a polarizing beam splitter including:
        a glass wedge having a first oblique surface;
        a multi-layer polarizing coating disposed on the first oblique surface of the glass wedge; and
        a plastic wedge having a second oblique surface,
    wherein the first oblique surface of the glass wedge is mated to the second oblique surface of the plastic wedge with the multi-layer polarizing coating sandwiched between the first and second oblique surfaces.

2. The apparatus of claim 1, further comprising:
    an illumination source to generate lamp light, the illumination source mounted to a first plastic surface of the plastic wedge; and
    a display panel to modulate an image onto the lamp light to generate image light, the display panel mounted to a first glass surface of the glass wedge,
    wherein the illumination source, the display panel, the glass wedge, the multi-layer polarizing coating, and the plastic wedge are arranged such that the lamp light enters the polarizing beam splitter through the plastic wedge, the multi-layer polarizing coating polarizes the lamp light after exiting the plastic wedge, and the multi-layer polarizing coating reflects the image light received from the display panel through the glass wedge out of the polarizing beam splitter before the image light reaches the plastic wedge.

3. The apparatus of claim 2, further comprising an eyepiece for a head mounted display, the eyepiece including:
    a light relay body having an eye-ward side and an external scene side, the light relay body coupled to an emission surface of the glass wedge to receive the image light from the polarizing beam splitter into the light relay body and to pass the image light along a forward optical path extending between the eye-ward side and external scene side within the light relay body;
    an out-coupling beam splitter disposed at an opposite end of the light relay body as the polarizing beam splitter, the out-coupling beam splitter oriented at an oblique angle to the eye-ward side of the light relay body; and
    an end reflector positioned to reflect the image light back towards the out-coupling beam splitter along a reverse optical path, wherein at least a first portion of the image light passes through the out-coupling beam splitter along the forward optical path and at least a second portion is redirected out the eyepiece along the reverse optical path.

4. The apparatus of claim 3, wherein the eyepiece further comprises:
    half-wave plate retarder disposed within the forward optical path between the polarizing beam splitter and the out-coupling beam splitter; and
    a quarter-wave plate retarder disposed within the forward and reverse optical paths between the out-coupling beam splitter and the end reflector,
    wherein the out-coupling beam splitter comprises a second polarizing beam splitter.

5. The apparatus of claim 4, wherein the second polarizing beam splitter comprises:
    a second plastic wedge;
    a second glass wedge; and
    a second multi-layer polarizing coating sandwiched between the second plastic and glass wedges, wherein the second polarizing beam splitter is oriented such that the reverse optical path is redirected out of the eyepiece without passing through the second plastic wedge.

6. The apparatus of claim 4, wherein of the polarizing beam splitter, the light relay body, and the second polarizing beam splitter, only the glass wedge of the polarizing beam splitter and the second glass wedge of the second polarizing beam splitter is fabricated of glass.

7. The apparatus of claim 3, wherein the out-coupling beam splitter comprises a non-polarizing beam splitter, and wherein of the polarizing beam splitter, the light relay body, and the non-polarizing beam splitter, only the glass wedge of the polarizing beam splitter is fabricated of glass.

8. The apparatus of claim 1, wherein the plastic wedge has a first index of refraction that substantially matches a second index of refraction of the glass wedge.

9. The apparatus of claim 1, wherein the polarizing beam splitter further comprises an optically clear adhesive disposed between the multi-layer polarizing coating and the second oblique surface of the plastic wedge to bond the plastic wedge to the glass wedge.

10. The apparatus of claim 9, wherein a third index of refraction of the optically clear adhesive substantially matches the first and second indexes of refraction.

11. The apparatus of claim 1, wherein a first plastic surface of the plastic wedge comprises an illumination surface for receiving unpolarized lamp light into the polarizing beam splitter, wherein a first glass surface of the glass wedge comprises an imaging surface out which the polarized lamp light passes from the polarizing beam splitter and in which polarized image light from a display panel is received, wherein the first plastic and glass surfaces are substantially parallel.

12. The apparatus of claim 1, wherein the plastic wedge comprises at least one of acrylic, Zeonex-E48R, or polymethyl-methacrylate.

13. A head mounted display, comprising:
    a first polarizing beam splitter including:
        a glass wedge having a first oblique surface;
        a multi-layer polarizing coating disposed on the first oblique surface of the glass wedge; and
        a plastic wedge having a second oblique surface, wherein the first oblique surface of the glass wedge is mated to the second oblique surface of the plastic wedge with the multi-layer polarizing coating sandwiched between the first and second oblique surfaces;
    an illumination source to generate lamp light mounted to the first polarizing beam splitter;
    a display panel to modulate an image onto the lamp light to generate image light, the display panel mounted to the first polarizing beam splitter; and
    an eyepiece coupled to the first polarizing beam splitter to receive the image light and to deliver the image light to an eye when the head mounted display is worn by a user.

14. The head mounted display of claim 13, wherein the illumination source is mounted to a first plastic surface of the plastic wedge, wherein the display panel is mounted to a first glass surface of the glass wedge, and wherein the illumination source, the display panel, the glass wedge, the multi-layer polarizing coating, and the plastic wedge are arranged such that the lamp light enters the first polarizing beam splitter through the plastic wedge, the multi-layer polarizing coating polarizes the lamp light after exiting the plastic wedge, and the multi-layer polarizing coating reflects the image light received from the display panel through the glass wedge out of the first polarizing beam splitter before the image light reaches the plastic wedge.

15. The head mounted display of claim 13, wherein the eyepiece comprises:
   a light relay body coupled to an emission surface of the glass wedge to receive the image light from the first polarizing beam splitter into the light relay body and to pass the image light along a forward optical path extending between an eye-ward side and an external scene side of the eyepiece within the light relay body;
   an out-coupling beam splitter disposed at an opposite end of the light relay body as the first polarizing beam splitter, the out-coupling beam splitter oriented at an oblique angle to the eye-ward side of the eyepiece; and
   an end reflector positioned to reflect the image light back towards the out-coupling beam splitter along a reverse optical path, wherein at least a first portion of the image light passes through the out-coupling beam splitter along the forward optical path and at least a second portion is redirected out the eyepiece along the reverse optical path.

16. The head mounted display of claim 15, wherein the eyepiece further comprises:
   a half-wave plate retarder disposed within the forward optical path between the first polarizing beam splitter and the out-coupling beam splitter; and
   a quarter-wave plate retarder disposed within the forward and reverse optical paths between the out-coupling beam splitter and the end reflector,
   wherein the out-coupling beam splitter comprises a second polarizing beam splitter.

17. The head mounted display of claim 16, wherein the second polarizing beam splitter comprises:
   a second plastic wedge;
   a second glass wedge; and
   a second multi-layer polarizing coating sandwiched between the second plastic and glass wedges, wherein the second polarizing beam splitter is oriented such that the reverse optical path is redirected out of the eyepiece without passing through the second plastic wedge.

18. The head mounted display of claim 15, wherein the out-coupling beam splitter comprises a non-polarizing beam splitter, and wherein of the first polarizing beam splitter, the light relay body, and the non-polarizing beam splitter, only the glass wedge is fabricated of glass.

19. The head mounted display of claim 13, wherein the plastic wedge has a first index of refraction that substantially matches a second index of refraction of the glass wedge.

20. The head mounted display of claim 13, wherein the polarizing beam splitter further comprises an optically clear adhesive disposed between the multi-layer polarizing coating and the second oblique surface of the plastic wedge to bond the plastic wedge to the glass wedge.

21. The head mounted display of claim 13, wherein the plastic wedge comprises at least one of acrylic, Zeonex-E48R, or poly-methyl-methacrylate.

* * * * *